(12) United States Patent
Cuevas (10) Patent No.: US 7,382,582 B1
(45) Date of Patent: Jun. 3, 2008

(54) REDUCED CROSS TALK IN WIRELESS SUSPENSIONS

(75) Inventor: Rafael Cuevas, Temecula, CA (US)

(73) Assignee: Magnecomp Corporation, Temecula, CA (US)

(*) Notice: Subject to any disclaimer, the term of this patent is extended or adjusted under 35 U.S.C. 154(b) by 0 days.

(21) Appl. No.: 11/402,429

(22) Filed: Apr. 12, 2006

Related U.S. Application Data (63) Continuation-in-part of application No. 10/195,808, filed on Jul. 15, 2002, now abandoned, which is a continuation-in-part of application No. 09/611,427, filed on Jul. 7, 2000, now abandoned.

(60) Provisional application No. 60/374,462, filed on Apr. 19, 2002, provisional application No. 60/191,021, filed on Mar. 21, 2000.

(51) Int. Cl.
*G11B 5/48* (2006.01)

(52) U.S. Cl. .................................. 360/245.9

(58) Field of Classification Search ............... None
See application file for complete search history.

(56) References Cited

U.S. PATENT DOCUMENTS

| | | | |
|---|---|---|---|
| 5,491,597 A | 2/1996 | Bennin et al. | |
| 5,737,152 A | 4/1998 | Balakrishnan | |
| 5,995,328 A | 11/1999 | Balakrishnan | |
| 6,414,820 B1 | 7/2002 | Coon et al. | |
| 6,424,500 B1 | 7/2002 | Coon et al. | |
| 6,493,190 B1 | 12/2002 | Coon | |
| 6,631,052 B1 | 10/2003 | Girard et al. | |
| 6,900,967 B1 | 5/2005 | Coon et al. | |
| 2001/0001587 A1 | 5/2001 | Lee et al. | |
| 2002/0041469 A1 | 4/2002 | Shiraishi et al. | |

FOREIGN PATENT DOCUMENTS

| WO | WO 97/36290 | 10/1997 |
|---|---|---|
| WO | WO 98/14937 | 4/1998 |

*Primary Examiner*—David D Davis
(74) *Attorney, Agent, or Firm*—Intellectual Property Law Office of Joel D. Voelzke (57) ABSTRACT

Reduced cross talk between adjacent read and write circuits in a disk drive suspension interconnect results from interposing a ground trace conductor between the circuits and generally for the full length thereof and grounding the ground trace conductor suitably through a further metal layer on the opposite side of the insulative layer that supports the interconnect read and write circuits. The ground trace conductor or other metal strip located like ground trace conductor is used to define a precise locus for optical alignment of the electrical interconnect relative to the suspension flexure better than the insulative layer through more accurate etching of the metal strip. The first metal layer and the insulative layer may be made by an additive process.

28 Claims, 4 Drawing Sheets

REDUCED CROSS TALK IN WIRELESS SUSPENSIONS

RELATED APPLICATIONS

This application is a continuation in part of my application Ser. No. 10/195,808, filed Jul. 15, 2002 now abandoned, which application is a continuation in part of Ser. No. 09/611,427, filed Jul. 7, 2000 now abandoned, which application claims the benefit of U.S. Provisional Application Ser. No. 60/191,021, filed Mar. 21, 2000. Application Ser. No. 10/195,808 also claims the benefit of U.S. Provisional Application Ser. No. 60/374,462, filed Apr. 19, 2002. The disclosures of these applications are hereby incorporated herein by this reference.

BACKGROUND OF THE INVENTION

1. Field of the Invention

This invention relates to disk drive suspensions and, more particularly, to wireless electrical interconnects for disk drive suspensions of the type having pairs of conductive traces carried on an insulative film layer and forming separated read and write circuits that are subject to signal degrading cross talk from voltages induced in one circuit from signal transmissions in the other circuit.

The invention achieves a reduction in such cross talk by interposing locally in a plane between the circuits a ground trace conductor that is suitably grounded to the mount plate, or otherwise, and preferably through a metal layer attached on the opposite side of the insulative layer, to limit voltage induction in one circuit from signal transmission in another circuit. Additionally, the presence of the ground trace conductor on the interconnect provides a precisely etchable material that can define a positioning locus more accurately than the plastic film insulative layer usually available for forming and using alignment indicia.

2. Description of the Related Art

Disk drive suspensions comprised of load beams, flexures and electrical interconnects are known. Typically, the electrical interconnect comprises an additive or subtractive laminate of a plastic film insulative layer and a conductive first metal layer in which plural pairs of conductive traces are formed typically as read and write circuits. A second metal layer on the opposite side of the insulative layer can provide support and a means to attach the laminate to a load beam. Necessarily close spacing of the conductive trace pairs allows the inducing of unwanted voltages in adjacent pairs, degrading the signal being transmitted with cross talk.

BRIEF SUMMARY OF THE INVENTION

It is an object therefore of the present invention to provide an improved electrical interconnect for a disk drive suspension. It is a further object to substantially block voltage induction between adjacent read and write circuits in an electrical interconnect. Another object is the provision of a ground trace conductor for generally the full length of the conductive traces forming the circuits to effect the voltage induction blocking. Additional objects include providing a second metal layer to the laminate that is grounded and to which the a ground trace conductor is connected in grounding relation against cross talk between the trace conductors, suitably through a passage in the insulative layer filled with conductive material, and using the ground trace conductor or similar metal strip to define a detectable locus for the positioning of the interconnect. A further object includes arranging the ground trace conductor on an additive interconnect. Other objects will appear hereinafter.

The invention thus provides in achieving these and other objectives an electrical interconnect for a disk drive suspension, the interconnect comprising an insulative film layer and supported thereby first and second pairs of conductive traces each having a longitudinal extent and contained in respective first and second planes normal to said film layer, the conductive trace pairs being opposed to each other in spaced relation, the conductive trace pairs being adapted to define respectively read and write circuits, the conductive trace pairs being arranged such that signal transmission in one pair induces a cross talk voltage in the other pair, and a ground trace conductor disposed in a third plane parallel to and between the first and second planes and extending for substantially the longitudinal extent of the first and second pair of conductive traces, the ground trace conductor being connected to ground in induced voltage reducing relation between the pairs, whereby the cross talk voltage in the other pair from transmission in the one pair is reduced.

In this and like embodiments, typically, the interconnect is an additive assembly of said insulative film layer and said conductive traces and grounding trace conductor, the conductive traces comprise copper and extend in a common plane generally parallel with said insulative film layer, the ground trace conductor comprises copper and extends in the conductive trace common plane, the electrical interconnect further comprises a metal layer attached to the insulative film layer opposite the conductive trace pairs, the electrical interconnect is combined with a load beam, the electrical interconnect further comprises a metal layer attached to the insulative film layer opposite the conductive trace pairs, with the ground trace conductor being grounded through the insulative film layer to the metal layer.

In a further embodiment, the suspension comprises a flexure, and the trace conductor defines a locus usable for precise interconnect alignment of the conductive trace pairs on the suspension, the ground trace conductor being locally apertured to define the locus.

In another embodiment, the invention provides an electrical interconnect for a disk drive suspension comprising a laminate of a first metal layer comprising first and second pairs of conductive traces disposed in spaced, opposed parallel planes, the conductive trace pairs having a longitudinal extent, the conductive trace pairs being adapted to define respectively read and write circuits, a second metal layer, and an insulative layer between the first and second metal layers normal to said conductive trace parallel planes, the conductive trace pairs being arranged such that signal transmission in one pair induces a cross talk voltage in the other pair, and a ground trace conductor disposed between said conductive trace planes for substantially all of their said longitudinal extent, the ground trace conductor being electrically grounded to the second metal layer in induced voltage reducing relation between the pairs, e.g. via a passage through said insulative layer with an electrically conductive material within said passage, whereby the cross talk voltage in the other pair from transmission in the one pair is reduced.

In this and like embodiments, typically, the laminate is an additive assembly of the insulative layer, e.g. a polyimide film, disposed on the second metal layer and the first metal layer disposed on the insulative layer, the second metal layer comprises stainless steel, the insulative layer has first and second sides, the conductive traces are attached to the first side of the insulative layer, and the second metal layer is attached to the second side of the insulative layer, the insulative layer defines a through passage between the layer first and second sides, and a conductive material is disposed within the passage, the conductive material electrically connecting the ground trace conductor with the second metal layer, the passage comprises a hole through the insulative layer, and the conductive material comprises silver-filled epoxy, the conductive traces comprise copper and extend in a common plane generally parallel with the insulative layer, the second metal layer extends in a plane generally parallel to the common plane, the ground trace conductor lies in the common plane and comprises stainless steel, the conductive traces comprise copper and extend in a common plane generally parallel with the ground trace conductor, the conductive trace pairs extend are laterally spaced along their longitudinal extent, the ground trace conductor being between and substantially equidistantly spaced from each the conductive trace pair in opposed relation to each the conductive trace pair, the second metal layer comprises stainless steel, the insulative layer has first and second sides, the conductive traces are attached to the first side of the insulative layer, and the second metal layer is attached to the second side of the insulative layer, the insulative layer defines a passage through the layer between the first and second sides, and a conductive material is disposed within the passage, the conductive material electrically connecting the ground trace conductor with the second metal layer, the passage typically comprising a hole through the insulative layer, and the conductive material comprises silver-filled epoxy.

As in previous embodiments, the electrical interconnect is usable in combination with a load beam, and where the suspension further comprises a flexure supported by the load beam, the ground trace conductor can define a locus in known spatial relation to the desired alignment of the interconnect with the flexure, preferably the ground trace conductor comprising stainless steel and being locally apertured to define the locus.

In a further embodiment, the invention provides a disk drive suspension comprising a beam, such as a load beam having a base portion, a spring portion and a beam portion, or a multipiece assembly of base, spring and stiffener parts, and an electrical interconnect, the interconnect comprising a laminate of an insulative layer and a conductive trace metal layer comprising first and second conductive trace pairs, the conductive trace pairs being arranged such that signal transmission in one pair induces a cross talk voltage in the other pair, and a ground trace conductor disposed between the first and second conductive trace pairs, the ground trace conductor being grounded in induced voltage reducing relation between the conductive trace pairs, whereby the cross talk voltage in the first conductive trace pair from transmission in the second conductive trace pair is reduced.

In this and like embodiments, typically, the insulative layer comprises a polyimide film, the conductive trace metal layer is a first metal layer, the laminate further comprises a second metal layer generally opposite the first metal layer across the insulative layer, the first and second metal layers comprise copper and stainless steel respectively, and a part of the first metal layer is grounded through the second metal layer, there is conductive material electrically connecting the first metal layer part and the second layer, such as a mixture of particulate conductors and a resin, the polyimide insulative layer defines a passage between the first and second layers, the passage enclosing the conductive material in first metal layer part and second metal layer electrically connected relation, the conductive traces comprise copper and extend in a common plane, the second metal layer extends in a plane generally parallel to the common plane, the ground trace conductor comprises stainless steel and extends in the common plane, the conductive traces extend in the common plane generally parallel with the ground trace conductor, the conductive trace pairs extend longitudinally and are laterally spaced, the ground trace conductor being between and substantially equidistantly spaced from each conductive trace pair in opposed relation to each conductive trace pair, the second metal layer comprises stainless steel, the insulative layer having first and second sides, the conductive traces being attached to the first side of the insulative layer, and the second metal layer being attached to the second side of the insulative layer, the insulative layer defining a passage such as a hole through the layer between the insulative layer first and second sides, and a conductive material disposed within the passage, the conductive material, e.g. silver-filled epoxy, electrically connecting the ground trace conductor with the second metal layer.

In its method aspects, the invention provides a method for reducing cross talk in a disk drive suspension interconnect comprising a laminate of an insulative layer and first and second pairs of conductive traces having a longitudinal extent, including maintaining the conductive trace pairs opposed to each other in spaced relation, the conductive trace pairs being arranged such that signal transmission in one pair induces a cross talk voltage in the other pair, and disposing a ground trace conductor between the first and second pair of conductive traces for substantially all of their longitudinal extents, and connecting the ground trace conductor to ground in induced voltage reducing relation between the pairs.

In this and like embodiments, the method further includes selecting as the insulative layer a material comprising polyimide, selecting as said laminate an additive assembly of said first metal layer on said insulative layer, selecting as the conductive traces, and as the ground trace conductor, conductive traces and ground trace conductors comprising copper, and extending the conductive traces and the ground trace conductor in a common plane, providing a second conductive metal layer on the insulative layer opposite the conductive traces, grounding the second conductive metal layer, and electrically connecting the ground trace conductor to the second conductive metal layer through the insulative layer, and selecting as said laminate an additive assembly of said insulative layer on said second metal layer and said first metal layer on said insulative layer.

In a further method embodiment the invention provides a method of fabricating an electrical interconnect for a disk drive suspension, including providing on a first side of an insulative layer a first metal layer comprising first and second pairs of conductive traces opposed, preferably laterally opposed, to each other in spaced relation and having a longitudinal extent, providing on a second side of the insulative layer a second metal layer adapted to be connected to ground, the conductive trace pairs being arranged such that signal transmission in one pair induces a cross talk voltage in the other pair, disposing a ground trace conductor in a plane extending between the first and second conductive trace pairs for substantially their longitudinal extent, and electrically connecting the ground trace conductor to ground in induced voltage reducing relation between the pairs, and further including selecting as the insulative layer a material comprising polyimide, selecting as said laminate an additive assembly of said insulative layer on said second metal layer and said first metal layer on said insulative layer, selecting copper as the first metal layer and stainless steel as the second metal layers, forming a passage through the insulative layer between the first and second sides thereof, maintaining within the passage a conductive material, and electrically connecting the ground trace conductor and the second metal layer with the conductive material, selecting as the conductive material a material comprising silver-filled epoxy, maintaining the conductive trace pairs and the ground trace conductor in a common plane, and maintaining the second metal layer generally parallel to the common plane, extending the conductive trace pairs longitudinally and laterally spaced, and maintaining the ground trace conductor between and substantially equidistantly spaced from each the conductive trace pair in opposed relation to each the conductive trace pair, forming a passage in the insulative layer between the layer first and second sides, and disposing a conductive material within the passage, and electrically connecting the conductive material with the ground trace conductor and with the second metal layer in grounding relation.

In a further embodiment, the invention provides a method of aligning a suspension flexure with an electrical interconnect comprising plural trace conductors on an insulative layer, including maintaining on the interconnect adjacent the plural conductors a metal strip that etches more precisely than the insulative layer, etching optically readable indicia into the metal strip, the indicia having a known positional relation for correct alignment of the interconnect with the flexure, and aligning the interconnect with the flexure using the indicia. The method further including selecting as the metal strip a metal strip comprising copper, and locally aperturing the strip to define the indicia.

In a further embodiment, the invention provides a method of operating with reduced cross talk a disk drive suspension comprising a flexure, a slider, a beam portion and an electrical interconnect comprising a first metal layer formed into first and second pairs of conductive traces on an insulative layer, including providing in operating proximity to the conductive trace pairs a ground trace conductor, and grounding the ground trace conductor through the ground trace conductor in induced voltage reducing relation between the pairs, the method further including maintaining a second metal layer attached to the insulative layer and opposed to the conductive traces, the second metal layer being grounded, and grounding the ground trace conductor through the second metal layer.

BRIEF DESCRIPTION OF THE SEVERAL VIEWS OF THE DRAWINGS

The invention will be further described in conjunction with the attached drawings in which.

DETAILED DESCRIPTION OF THE INVENTION

Flexible circuits use trace conductors laminated to an insulative substrate to defines the read and write signal paths. These circuits have critical transmission problems caused by the effect of cross talk. New memory products require of flexible circuits higher speed rate data, reduced cross talk, constant impedance, and lower cost.

In parent application Ser. No. 09/611,427, referenced above, improvements in suspension design to obtain a differential impedance between the write and read circuits were disclosed. As there disclosed, the invention improvements provided an alternative to known expedients for increasing capacitance, an alternative that did not require modification of the flexure laminate in that the two layers of the laminate were, differently etched, one for the read circuit and one for the write circuit. By stacking the write circuit-containing laminate atop the read circuit-containing laminate, a greater spacing for the write circuit was achieved, and the read circuit spacing, desired to be closer, was maintained.

In a mechanically and electrically critical device such as a disk drive suspension interconnect it is difficult to achieve the desired Z (impedance) and C (capacitance) control simultaneously and also meet the mechanical requirements for stiffness and frequency response in the space allocated. Using prior art techniques, such as the removal of the stainless steel layer under the traces, makes the part be asymmetrical when the Z is adjusted by controlling the C. For example, the read side (60 ohms) would require larger capacitance than the write side (110 ohms), so the traces would have to be wider than the other (write) side and the flexure would be asymmetrical mechanically, or the stainless would have to be removed from the write side, again leading to asymmetrical mechanics. The asymmetry of the mechanics is because the modulus of elasticity of both stainless and copper are very high relative to polyimide.

It is difficult or impossible to meet all of the conflicting requirements simultaneously with prior art techniques with even the presently most advanced circuit designs having performance characteristics far different from the optimum. Thus, by using such prior art design techniques, a wireless flexure and a suspension assembly thereof could be achieved that met the specification for read and write impedance and stiffness but not at the same time the specification for capacitance or resistance.

This problem there was solved by interposing the read circuit between the write circuit and the laminate metal layer. Most of the capacitance from trace to trace is controlled by the trace to stainless steel layer capacitance, and this capacitance is controlled by the thickness of the polyimide, which is effectively increased by the two-layer stacking used in the invention. In the prior art, see FIG. 8, the read and write circuit transmission lines generally have the same dimensions and as consequence have very similar differential impedance. Newer disk drive designs require smaller sliders with lower impedance values and higher read and write frequencies. In the prior art there is impedance incompatibility between the slider and pre-amplifier, losses, and noise in the transmission. This has led to a demand for a difference of characteristic impedance between the read and write traces; the read traces need to be around 60 ohms and the write traces around 100 ohms.

The present invention addresses particularly noise issues arising from mutually induced voltages between the adjacent read and write circuits, and specifically the need for reduced cross talk. For this purpose, in accordance with the invention a grounded trace circuit is added at the level of the transmission or signal traces. The grounded trace is usually a copper layer, and usually positioned between the transmission lines pairs on the flexible circuit of the suspension. The grounded trace circuit can be electrically connected to the metal layer of a metal layer-containing flexible circuit laminate, the suspension load beam or mount plate, each to be connected to ground to ground the grounded trace circuit. Alternatively, the grounded trace circuit can be grounded through a ground plane provided opposite the traces across the thickness of the insulative layer, suitably using a conductive passage through the insulative layer filled with silver-epoxy mixture. The invention ground trace can be used in all wireless suspension technologies.

Generally, the interconnects herein comprise a laminate that is either additive in the sense that the one or several layers of metal, including first layer used to define the conductive traces and a second layer used to support the interconnect and/or as a ground for the ground trace conductor herein, the insulative film and conductive traces are built up on one another, or subtractive in the sense that a full laminate of these layers is reduced in one or more areas to fewer than all layers.

The electrical benefits of the invention include reduced cross talk between the read and write traces, reduced events of ESD (Electro Static Discharge) in the read or write traces, as a spark discharge will be through the grounded trace in a ratio of about 95% to the grounded trace and only 5% to the signal traces, and increased speed of the signals on the signal traces. The mechanical benefits include increased stiffness of the flexure where that is desirable by adding e.g. 100 microns in width of copper, optical alignment using the precisely etchable metal layer from which the grounded trace is formed to define a locus for optical reading in flexible circuit and flexure alignment operations, because etch processes on flexible circuits show higher accuracy in the copper layer than in the polyamide insulative layer materials. Using this accuracy, the design of holes in the copper ground trace circuit enables better aligning of the flex circuit to the flexure and or the load beam, than realized using a derivative of the signal traces to guide alignment.

Cross talk between two conductors depends on their mutual inductance and capacitance. The mutual inductive coupling theory postulates that returning signal currents will generate magnetic fields. These magnetic fields in turn induce voltages in other circuit traces. In the invention, the use of a grounded trace between the signal traces reduces the cross talk in some cases up to 55%. In order to get these cross talk values a grounded trace is used between the read and write signal trace pairs.

Figure 2:
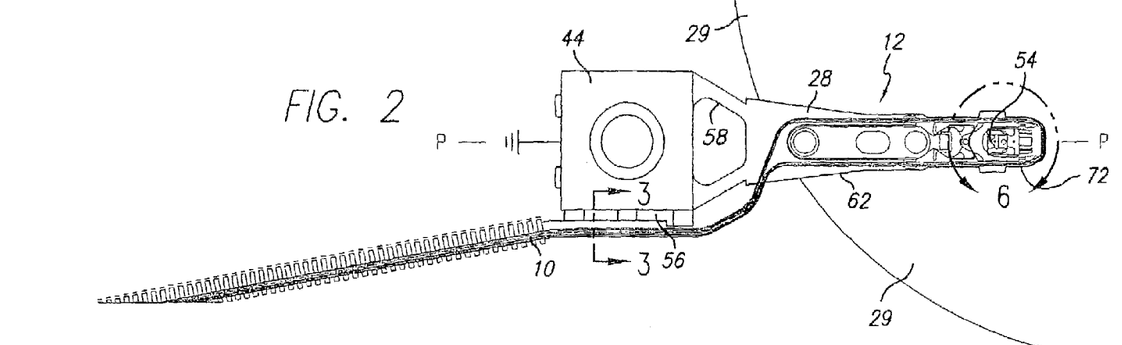
FIG. 2 is a plan view of a suspension according to the invention.
Figure 3:
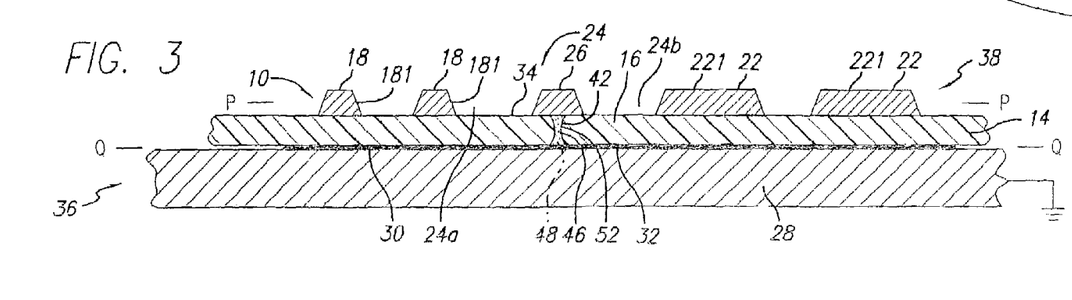
FIG. 3 is a view taken on line 3-3 of FIG. 2.

With reference now to the drawings in detail, in FIGS. 2 and 3 an electrical interconnect 10 is shown for a disk drive suspension 12. Interconnect 10 comprises an insulative layer 14 such as a polyimide film 16 and supported thereby first and second pairs of conductive traces 18, 22. Conductive trace pairs 18, 22 conveniently formed by etching a copper or other conductive metal sheet or layer attached to the insulative layer 14 (subtractive process) or the traces can be deposited onto the insulative layer with suitable masking (additive process). Conductive trace pairs 18, 22 are laterally opposed to each other in spaced relation across a gap 24, as shown, but, as noted elsewhere herein these traces can be stacked vertically, as in the Ser. No. 09/611,427 parent application hereto, and the ground trace interposed in a similar manner to reduce noise and cross-talk.

Figure 1:
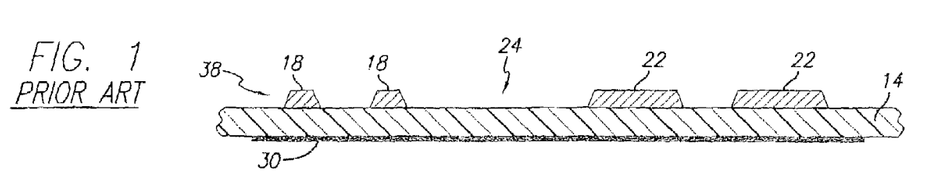
FIG. 1 is a PRIOR ART view like FIG. 2 taken in transverse section of an electrical interconnect.

Conductive trace pairs 18, 22 are adapted to define respectively read circuit and a write circuit. The conductive trace pairs 18, 22 owing to space limitations and other design constraints when disposed as shown tend to have signal transmission in one pair induce a cross talk voltage in the other pair. In the prior art, see FIG. 1, the gap 24 is devoid of conductors and without a grounding medium between them. In the invention, however, FIGS. 2 and 3, a ground trace conductor 26 is disposed between the e.g. first and second pairs 18, 22 of conductive traces. Ground trace conductor 26 is connected to ground in induced voltage reducing relation between the pairs 18, 22. Thus, cross talk voltage in the other conductive trace pair 22 from signal transmission in the one conductive trace pair 18 is reduced.

Figure 4A:
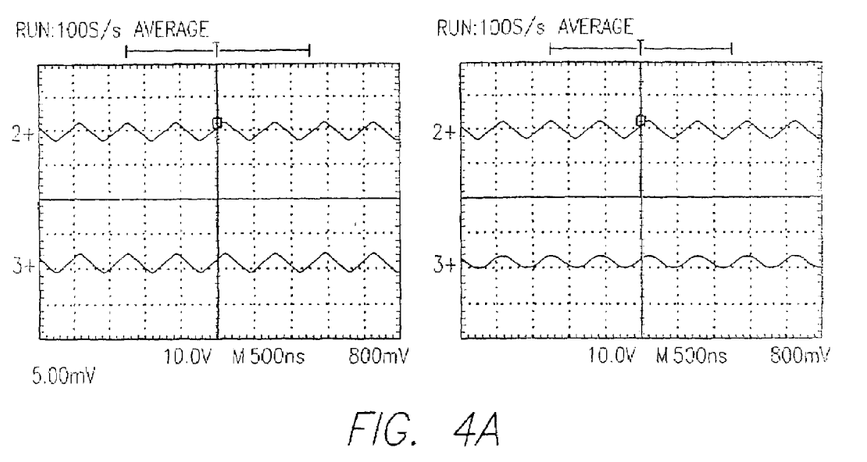
FIG. 4A is a graphical depiction of the reduced cross talk obtained in accordance with the invention.
Figure 4B:
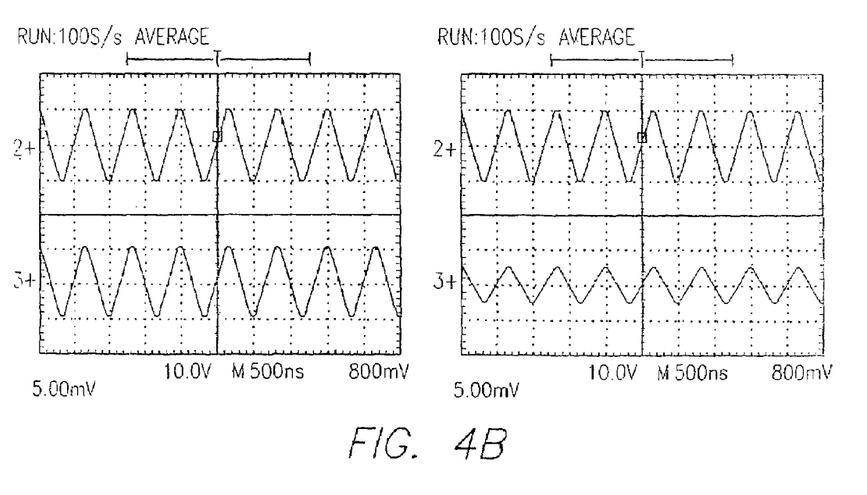
FIG. 4B is a further graphical depiction of the reduced cross talk obtained in accordance with the invention.

In FIGS. 4A and 4B, cross talk effects are shown in graphical form. In FIG. 4A, the input signal was 5 volts. The left hand chart upper curve shows the signal in one trace and the lower curve the induced voltage in the adjacent trace, in an interconnect having upper and lower metal layers, cf. FIG. 1, at 1.5 MHz. The right hand chart shows the result of the invention. Signal conditions at 1.5 MHz are the same, but the traces 181, 221 are disposed alongside the ground trace 26, see FIG. 3. The lower curve departs significantly from the profile of the upper curve unlike the left hand chart curves, indicating much less induced voltage in the adjacent trace. In FIG. 4B, where the input voltage was 20 volts, a similar pattern is clear, confirming the effectiveness of using the ground trace 26 according to the invention.

FIGS. 4A and 4B further demonstrate that the invention provides the possibility of increasing the data speed rate without a commensurate increase in cross talk removing an obstacle to increased data speed rates. Note that with the invention, cross talk voltage is controlled low despite an increase in signal. Low cross talk levels enable high resolution with high frequency and less noise. When cross talk is reduced the integrity of the read and write channel signal is increased, an important factor for the read/write speed rate.

Figure 5:
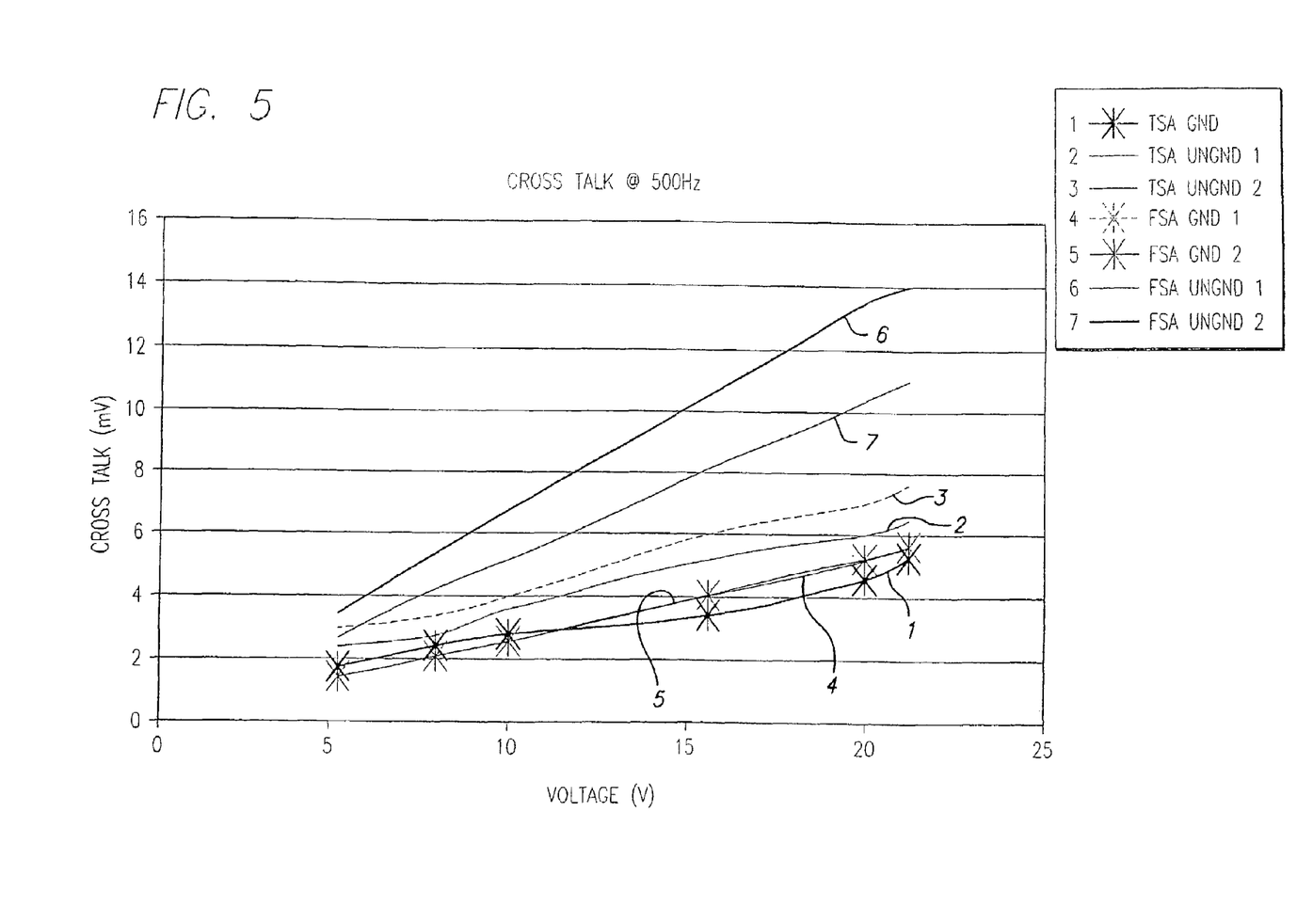
FIG. 5 is a comparative chart of cross-talk results with different embodiments of the invention and without the invention.

FIG. 5 depicts cross talk in millivolts on the Y-axis volts on the X-axis for different suspension interconnects (10). Curves for suspension interconnects with a ground trace are notated with asterisks. Interconnects, and curves, Nos. 1, 2 and 3 are comprised a laminate of trace conductors, insulative plastic film and a second metal layer of stainless steel, designated TSA (Trace Suspension Assembly). Only interconnect No. 1 had a ground trace. The reduced amount of induced voltage (and thus cross-talk) in the No. 1, ground trace, embodiment of the invention is apparent.

In a different embodiment using an interconnect without a stainless steel layer, but having a copper second metal layer 30, referred to as an FSA (Flex Suspension Assembly), the effect of the use of the ground trace (curves, and interconnects, Nos. 4 and 5 denoted with asterisks) is again apparent versus the no-ground-trace, standard interconnect, depicted in curves Nos. 6 and 7. As will be evident, the reduction in induced voltage in these examples ranges from as much as 55% for the FSA embodiment to about 30% for the TSA embodiment.

Typically, as noted, the insulative layer 14 comprises polyimide film 16. Preferably, the conductive traces 181, 221 of pairs 18, 22 comprise copper and extend in a common plane P-P.

In the present embodiment, the electrical interconnect 10 is combined with a load beam 28 that supports the interconnect for movement over a disk 29. The electrical interconnect 10 further comprises an optional metal layer 30 laminated or otherwise attached to the insulative film layer 14 on a side 32 of the layer 14 that is opposite the insulative layer adjacent side 34 that the conductive trace pairs 18, 22 are attached to. Metal layer 30 is suitably used to ground the ground trace conductor as explained hereinafter.

Where the optional second metal layer 30 is present, the invention electrical interconnect 10 comprises a laminate 36 of the first metal layer 38 comprised of the first and second pairs of conductive traces 18, 22, the conductive trace pairs the second metal layer 30, and the insulative layer 14 between the first and second metal layers. The first and second conductive trace pairs 18, 22 formed in the first metal layer 38 are opposed to each other across the gap 24 in laterally spaced relation.

Ground trace conductor 26 is disposed between the first and second pair of conductive traces 18, 22 in the gap 24. Ground trace conductor 26, being that part of the first metal layer 38 forming the ground trace conductor and not the conductive traces 18, 22 is electrically connected at 42 and grounded through the second metal layer 30 to a ground such as the load beam 28 or mounting plate 44 in induced voltage reducing relation between the pairs.

For purposes of electrically connecting the first and second metal layers 38, 30, the insulative layer 14 defines a passage 46 through the insulative layer between the first and second sides 32, 34 thereof into which a conductive material 48 is disposed that electrically connects the first metal layer 38 conductive trace 26 with the second metal layer 30. Typically, the passage 46 comprises a hole 52 through the insulative layer 14, and the conductive material 48 preferably comprises a conductive metal or a conductive metal mixture, such as silver-filled epoxy.

The conductive traces 181, 221, the ground trace conductor 26 and the second metal layer 30 all preferably comprise stainless steel, but other highly conductive materials, e.g. aluminum, gold, and silver, can be used for each or all of these components.

In terms of relative orientation, the conductive traces, 181, 221 extend in a common plane P-P, the second metal layer 30 extends in a plane Q-Q generally parallel to the common plane P-P, and the ground trace conductor 26 lies in the common plane P-P parallel with the plane Q-Q. The conductive trace pairs 18, 22 extend longitudinally along the interconnect 10 and are spaced, usually laterally as shown, but vertically if desired, with the ground trace conductor 26 being between and substantially equidistantly spaced from each conductive trace pair in opposed relation to each conductive trace pair across like sized air gaps 24a, 24b, or otherwise insulated from contact with the conductive traces 181, 221.

The insulative layer 14 first and second sides 32, 34 have the conductive traces 181, 221 attached to the first side 34, and the second metal layer 30 attached to the second side 32. Insulative layer 14 defines passage 46 through the layer between the first and second sides 32, 34. Conductive material 48 is disposed within the passage 48 as described above.

Figure 7:
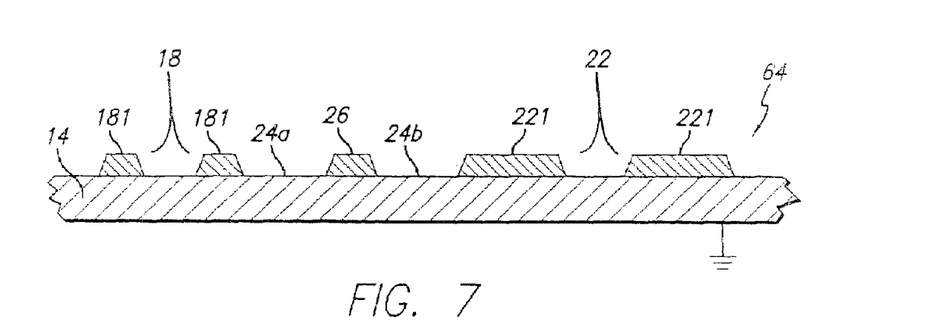
FIG. 7 is a view like FIG. 3 of an alternative embodiment.

The invention disk drive suspension 12 in the FIGS. 2 and 3 embodiments comprises the interconnect 10 as above described and a supporting beam, such as load beam 28, suitable for carrying on flexure 50 at tongue 51 supported by frame outriggers 53 a slider 54 at disk 29, and having a base portion 56, a spring portion 58 and a beam portion 62. Load beam spring portion can be unitary or separately formed and attached to the base portion 56 and the beam portion 62. An alternate form of interconnect 64, shown in FIG. 7, can also be used. There interconnect 64 comprises conductive trace pairs 18, 22 disposed on insulative layer 14, and ground trace 26 but has no second metal layer, such as 30 in FIG. 3. Grounding of the ground trace is to the mounting plate, for example, or the load beam 28 if present.

The invention method for reducing cross talk in a disk drive suspension interconnect 10 comprising a laminate 36 of an insulative layer 14 and first and second pairs of conductive traces 18, 22, includes maintaining the conductive trace pairs opposed to each other in spaced relation, the conductive trace pairs being arranged such that signal transmission in one pair induces a cross talk voltage in the other pair, and disposing a ground trace conductor 26 between the first and second pair of conductive traces, and connecting the ground trace conductor to ground in induced voltage reducing relation between the pairs. The method further includes selecting as the insulative layer 14 a film 16 comprising polyimide, selecting as the conductive traces 181, 221 and as the ground trace conductor 26 conductive material comprising copper, extending the conductive traces and the ground trace conductor in a common plane P-P, providing a second conductive metal layer 30 on the insulative layer 14 opposite the conductive traces 18, 22, grounding the second conductive metal layer, and electrically connecting the ground trace conductor to the conductive metal layer through the insulative layer.

In a further method embodiment, the invention provides a method of fabricating an electrical interconnect 10 for a disk drive suspension 12, including providing on a first side 32 of an insulative layer 14 a first metal layer 38 comprising first and second pairs of conductive traces 18, 22 opposed to each other in spaced relation across a gap 24, providing on a second side 34 of the insulative layer a second metal layer 30 adapted to be connected to ground, the conductive trace pairs being arranged such that signal transmission in one pair induces a cross talk voltage in the other pair, disposing a ground trace conductor 26 between the first and second conductive trace pairs, and electrically connecting the ground trace conductor via the second metal layer to ground in induced voltage reducing relation between the pairs. This method embodiment further includes selecting as the insulative layer 14 a film 16 comprising polyimide, selecting copper as the first metal layer 38 and stainless steel as the second metal layer 30, forming a passage 46 through the insulative layer between the first and second sides 32, 34 thereof, maintaining within the passage a conductive material 48, and electrically connecting the ground trace conductor to the second metal layer with the conductive material, and selecting as the conductive material a material comprising silver-filled epoxy. The method further includes maintaining the conductive trace pairs 18, 22 and the ground trace conductor 26 in a common plane P-P, maintaining the second metal layer 30 generally parallel to the common plane, extending the conductive trace pairs 18, 22 longitudinally and laterally spaced, maintaining the ground trace conductor between and substantially equidistantly spaced from each the conductive trace pair in opposed relation to each the conductive trace pair, forming a passage 46 in the insulative layer between the layer first and second sides 32, 34, disposing a conductive material 48 within the passage, and electrically connecting the conductive material with the ground trace conductor and with the second metal layer in trace conductor grounding relation.

Figure 6:
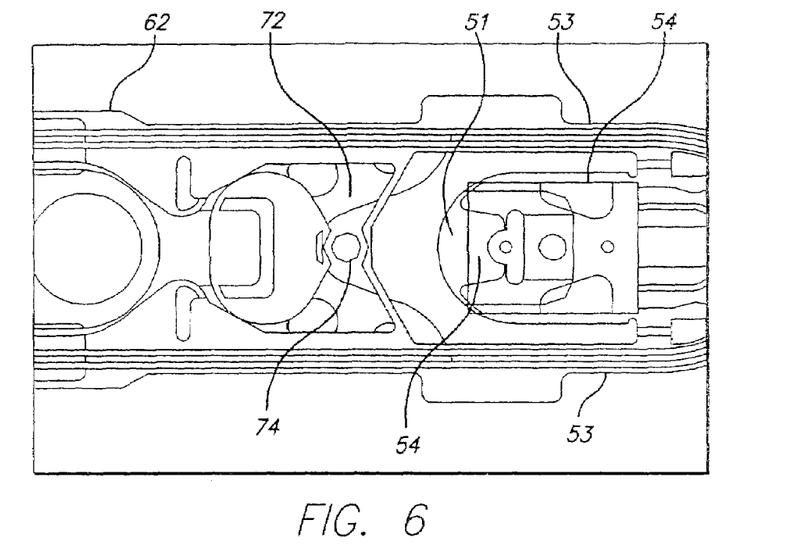
FIG. 6 is a view taken on line 6 in FIG. 2, showing the location of the aligning indicia for aligning the interconnect with the flexure.

With reference to FIGS. 2 and 6, in a further embodiment of the invention, suspension 12 further comprises a flexure 72 to carry the slider 54 that must be correctly aligned with the load beam 28. This alignment can be done using optical equipment, but precision in alignment depends on accurate reading of the orienting indicia. Using the insulative layer 14 or traces 181, 221, has proved problematic, since the optical indicia: an aperture in the layer 14 or the edge of the traces, for example, are not sufficiently precisely outlined after etching for precise reading and accurate alignment. It has further been found that an aperture in a metal strip 73, suitably a continuation of the copper layer forming ground trace 26 etches more sharply and thus forms a better indicium. Accordingly, in this embodiment of the invention, an optical indicium 74 is formed locally in the first metal layer 38, specifically in the ground trace 26, as shown in FIG. 6. This indicium, typically a simple hole, preferably having a polygonal perimeter, e.g. a hexagonal perimeter, as shown, serves as a reference for optically aligning the flexure 72 and load beam 28.

In method terms the invention includes aligning a suspension load beam 28 or flexure 72 with electrical interconnect 10, comprising plural trace conductors 18, 22 disposed on an insulative layer 14, by maintaining on the interconnect adjacent the plural conductors a metal strip/ground trace 73/26 that etches more precisely than the insulative layer, etching optically readable indicia 74 into the metal strip, the indicia having a known positional relation for correct alignment of the interconnect with the load beam or flexure, and aligning the interconnect with the load beam or flexure using the indicia. The method further includes selecting as the metal strip 73 a metal strip comprising copper, which can double as the ground trace 26 if suitably located to reduce induced voltages in the trace pairs 18, 22, and locally aperturing the strip to define the indicium 74.

In a further embodiment, the invention provides the method of operating with reduced cross talk a disk drive suspension 12 comprising a flexure 72, a slider 54, a beam portion 62 and an electrical interconnect 10 comprising a first metal layer 38 formed into first and second pairs of conductive traces 18, 22 on an insulative layer 14, including providing in operating proximity to the conductive trace pairs a ground trace conductor 26, and grounding the ground trace conductor in induced voltage reducing relation between the pairs. This method further includes maintaining a second metal layer 30 attached to the insulative layer 14 and opposed to the conductive traces 18, 22, the second metal layer being grounded, and grounding the trace conductor 26 through the second metal layer.

Figure 8:
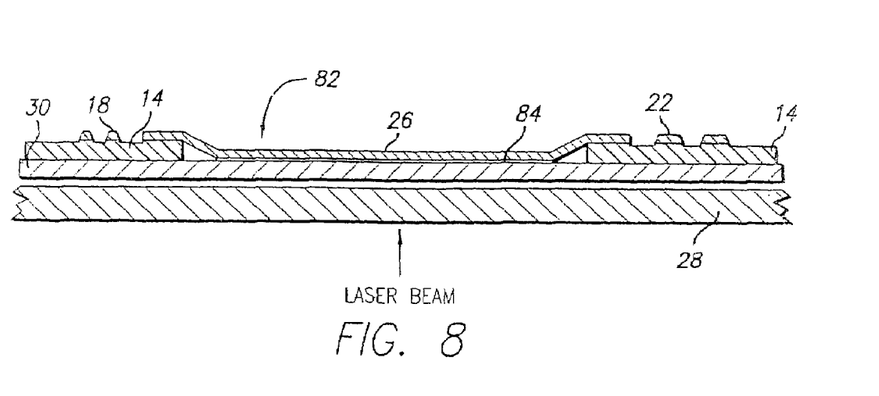
FIG. 8 is a fragmentary sectional view of the invention assembly arranged for welding.

FIG. 8 shows a method of laser welding the ground trace 26. The insulative film layer 14 is thinned or removed at the weld situs 82; the ground trace, suitably having a nickel or other weldable coating 84, contacts the second metal layer 30 and the two metal layers are fused with laser heat.

The invention thus provides an improved electrical interconnect for a disk drive suspension having substantially blocked voltage induction between adjacent read and write circuits through the provision of a ground trace conductor to reduce the voltage induction, and optionally a second metal layer to the laminate that is grounded and to which the conductive trace pairs are connected in grounding relation against cross talk, suitably through a passage in the insulative layer filled with conductive material. The invention further provides for the positioning of the interconnect relative to the load beam or flexure by using the ground trace conductor or similar metal strip to define a detectable locus.

The foregoing objects are thus met.

I claim:

1. An electrical interconnect for a disk drive suspension, said interconnect comprising:

an insulative layer;

first and second pairs of conductive traces supported by the insulative layer, each conductive trace having a longitudinal extent along substantially an entire length of a load beam, wherein said first pair of conductive traces forms a read circuit and said second pair of conductive traces forms a write circuit; and a ground trace conductor supported by the insulative layer and disposed between said first and second pairs of conductive traces and extending for substantially said longitudinal extent of said first and second pairs of conductive traces, said ground trace conductor being connected to ground so as to reduce a cross talk voltage induced between the first and second pairs of conductive traces;

wherein said ground trace conductor extends substantially parallel to, and between, said first and second pairs of conductive traces for substantially the entire length of said load beam.

2. The electrical interconnect according to claim 1, wherein said interconnect is an additive assembly of said insulative layer, said conductive traces and said ground trace conductor.

3. The electrical interconnect according to claim 1, wherein said conductive traces comprise copper and extend in a common plane parallel with said insulative layer.

4. The electrical interconnect according to claim 1, further comprising a metal layer attached to a bottom surface of said insulative layer opposite said conductive trace pairs, wherein said ground trace conductor is grounded to the metal layer.

5. The electrical interconnect according to claim 4, wherein said metal layer is sandwiched between said insulative layer and said load beam supporting said insulative layer.

6. The electrical interconnect of claim 4, further comprising a metal strip, wherein a portion of said metal strip defines said ground trace conductor and said metal strip has a channel having a bottom wherein said channel bottom is intimately disposed against said metal layer thereby grounding said ground trace conductor to said metal layer.

7. The electrical interconnect of claim 6, wherein said metal strip comprises copper with a weldable coating, said metal strip being welded to said metal layer.

8. The electrical interconnect according to claim 1, wherein said ground trace conductor defines a locus usable for precise interconnect alignment of said conductive traces on said suspension.

9. The electrical interconnect according to claim 8, wherein said ground trace conductor is locally apertured to define said locus.

10. The electrical interconnect of claim 1 further comprising a passage through the insulative layer through which the ground trace conductor is grounded to a grounding element.

11. The electrical interconnect of claim 1, wherein said reduction in cross talk voltage as compared with an identical electrical interconnect without said ground trace conductor is substantial.

12. The electrical interconnect of claim 11, wherein said reduction in cross talk voltage at a 5 volt input at 500 Hz is at least 30%.

13. The electrical interconnect of claim 12, wherein said reduction in cross talk voltage at a 5 volt input at 500 Hz is at least 55%.

14. The electrical interconnect of claim 1, wherein said ground trace conductor has substantially the same cross-section height and cross-section width as a trace selected from the group consisting of said first and second pairs of conductive traces.

15. The electrical interconnect of claim 14, wherein said ground trace conductor extends generally the full length of said first and second pairs of conductive traces.

16. The electrical interconnect of claim 15, wherein said ground trace conductor is substantially equidistantly spaced from each conductive trace pair in opposed relation to each conductive trace pair.

17. The electrical interconnect of claim 1, wherein said ground trace conductor is connected to ground so as to carry substantially only magnetically induced voltages.

18. The electrical interconnect of claim 1, wherein said ground trace conductor is electrically connected at one location only.

19. An electrical interconnect for a disk drive suspension, comprising:
 an insulative layer;
 at least one first trace providing a read circuit supported by the insulative layer;
 at least one second trace providing a write circuit supported by the insulative layer, wherein the at least one second trace is located at a predetermined distance and orientation from the at least one first trace and wherein said at least one first and at least one second traces extend along substantially an entire length of a load beam; and
 at least one ground trace supported by the insulative layer and located between the at least one first trace and the at least one second trace, the at least one ground trace being electrically coupled to a grounding element, thereby reducing cross talk voltage induced between the at least one first trace and the at least one second trace;
 wherein said at least one ground trace extends substantially parallel to, and between, said at least one first and at least one second traces for substantially the entire length of said load beam.

20. The electrical interconnect of claim 19 wherein:
 the at least one first trace comprises a first pair of conductive traces, each trace of the first pair of conductive traces being substantially parallel with respect to each other; and
 the at least one second trace comprises a second pair of conductive traces, each trace of the second pair of conductive traces being substantially parallel with respect to each other, wherein the first and second pairs of conductive traces are substantially parallel to each other.

21. The electrical interconnect of claim 20 wherein the at least one ground trace is disposed in substantially parallel fashion between the first and second pairs of conductive traces.

22. The electrical interconnect of claim 19 wherein the grounding element comprises a metal layer disposed adjacent to a bottom surface of the insulative layer.

23. The electrical interconnect of claim 22 further comprising a passage through the insulative layer through which the at least one ground trace may be electrically coupled to the metal layer.

24. The electrical interconnect of claim 19 wherein the at least one first conductive trace and the at least one second conductive trace extend in a common plane parallel with a top surface of the insulative layer.

25. The electrical interconnect of claim 24 wherein the at least one ground trace also extends in the common plane.

26. The electrical interconnect of claim 25 wherein the grounding element comprises a metal layer located adjacent to a bottom surface of the insulative layer opposite the at least one first and second conductive traces, wherein the metal layer is sandwiched between the insulative layer and the load beam.

27. The electrical interconnect of claim 19 wherein the at least one ground trace defines a locus for aligning the interconnect with another portion of the disk drive suspension.

28. The electrical interconnect of claim 27 wherein the locus comprises an aperture for optically aligning the interconnect with the load beam.

* * * * *